Nov. 28, 1967     T. L. FAWICK     3,354,670
FLEXIBLE COUPLING
Filed Sept. 3, 1965     2 Sheets-Sheet 1
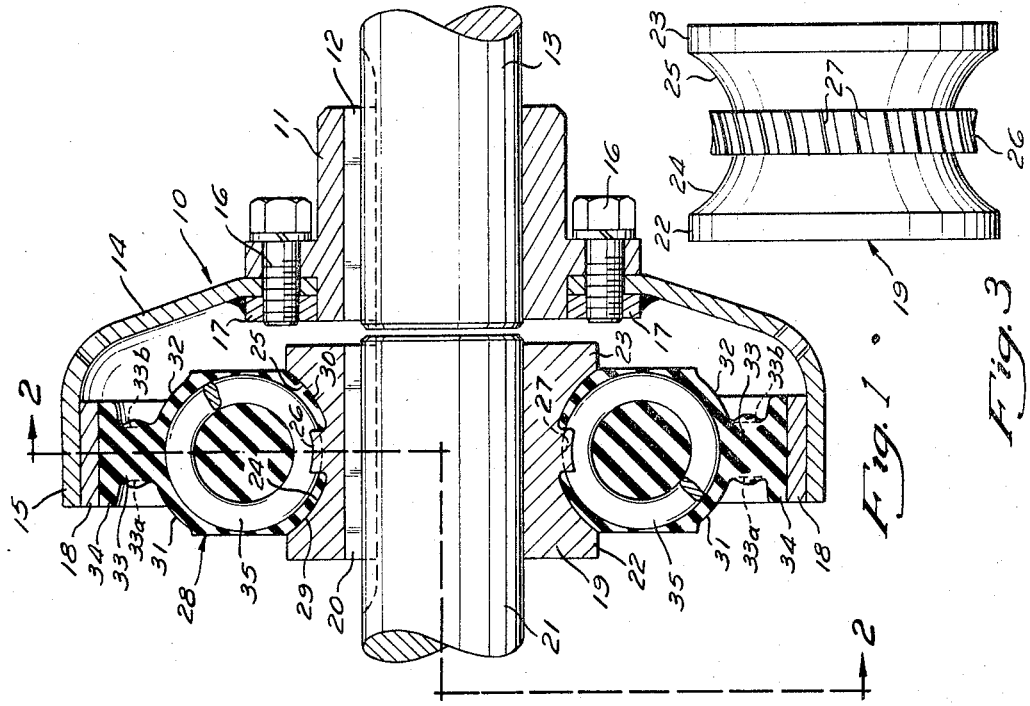
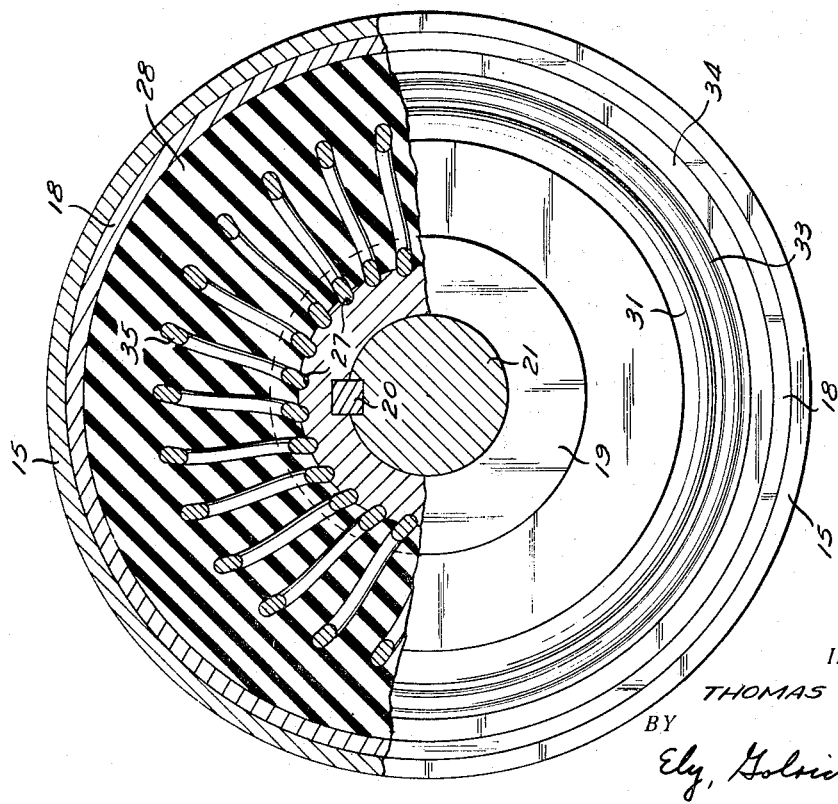
INVENTOR.
THOMAS L. FAWICK
BY
Ely, Golrick & Flynn
ATTORNEYS Nov. 28, 1967     T. L. FAWICK     3,354,670
FLEXIBLE COUPLING Filed Sept. 3, 1965     2 Sheets-Sheet 2

INVENTOR.
THOMAS L. FAWICK
BY
Ely, Golrick + Flynn
ATTORNEYS

United States Patent Office 3,354,670
Patented Nov. 28, 1967

3,354,670
FLEXIBLE COUPLING
Thomas L. Fawick, Shaker Heights, Ohio, assignor to Fawick Corporation, a corporation of Michigan
Filed Sept. 3, 1965, Ser. No. 484,945
15 Claims. (Cl. 64—11)

ABSTRACT OF THE DISCLOSURE

The flexible coupling comprises concentrically disposed outer and inner coupling structures with an annular rubber-like body bonded to them and under radial compression between them. A continuous coil spring annulus is embedded in the rubber-like body and has its inside turns radially expanded and resiliently gripping the inner coupling structure. The rubber-like body has a reduced axial thickness for greater flexibility radially outward from the location of the coil spring annulus.

---

This invention relates to a flexible coupling for transmitting torque between two rotatable shafts.

A principal object of this invention is to provide a novel and improved flexible coupling in which torque is transmitted between the two shafts by respective rigid rotatable coupling structures with a deformable and resilient annular body of rubber-like material engaged between them and a coil spring annulus composed of successive interconnected helical turns embedded in the rubber-like material of the body to enhance the latter's torque capacity for a given size of the coupling without, however, impairing its desired flexibility.

Another object of this invention is to provide such a coupling which has a high torque capacity for its size and which does not require lubrication.

Further objects and advantages of this invention will be apparent from the following detailed description of two presently-preferred embodiments thereof, which are illustrated in the accompanying drawings.

In the drawings:

FIGURE 1 is an axial section of a first embodiment of the present coupling;

FIGURE 2 is a view, partly in cross-section and partly in end elevation, taken along the line 2—2 in FIG. 1;

FIGURE 3 is a side elevational view of the inner coupling structure in the coupling of FIGS. 1 and 2;

Figure 5:
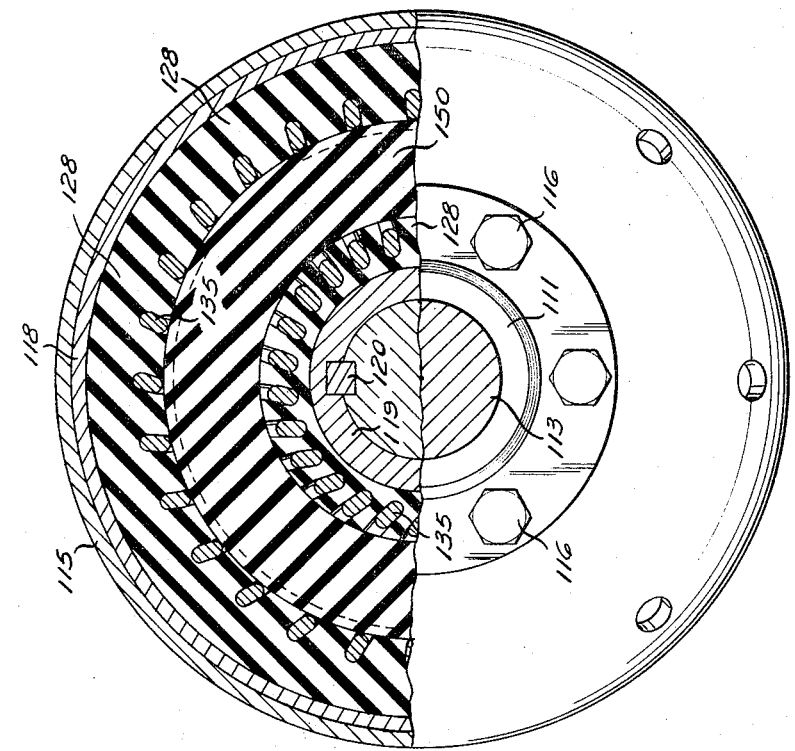
FIGURE 5 is a view, partly in cross-section and partly in end elevation, taken along the line 5—5 in FIGURE 4.

Referring first to FIGS. 1-3, the embodiment of the present invention shown therein comprises an outer, first rotatable coupling structure 10 including an annular central hub 11, which is keyed at 12 to a first rotatable shaft 13, an outwardly extending annular web 14, and an annular outer flange portion 15 connected to the outside of this web and projecting therefrom axially past the end of shaft 13. The inside of web 14 is detachably secured to the hub 11 by means of bolts 16 and a retaining ring 17 on web 14. This outer first coupling structure 10 also includes a metal ring 18 secured to the inside of the outer flange portion 15, such as by an epoxy resin adhesive. The outer flange portion 15 and ring 18 together constitute the outer flange of the first coupling structure 10.

This coupling has an inner, second rotatable coupling structure in the form of a one-piece annular body 19, keyed at 20 to a second shaft 21, which is in substantial alignment with the first shaft 13. This inner coupling body 19 (FIG. 3) has cylindrical opposite end sections 22 and 23, concave surfaces 24 and 25 extending axially and radially inward from these end sections, and a grooved center section 26 disposed between the inner end of these concave surfaces and projecting radially outward from the latter. This center section presents a plurality of external helical grooves 27 evenly spaced apart circumferentially around this center section and all extending at the same helix angle with respect to the longitudinal axis of coupling body 19. The inner coupling body presents teeth between these grooves.

In accordance with the present invention, a deformable and resilient annular body 28 of soft rubber or rubber like material is engaged between the outside of the inner coupling structure 19 and the inside of ring 18 on the outer flange of the outer coupling structure 10. This rubber-like body is molded in place between the inner coupling body 19 and ring 18 as described hereinafter and is bonded to both of them by vulcanized adhesion.

As shown in FIG. 1, the radially inward side of the rubber-like body 28 presents convex annular surfaces 29 and 30 which snugly conform to, and are bonded to, the respective concave surfaces 24 and 25 of the inner coupling body 19. Throughout about one-half of its radial thickness outward from the inner coupling structure, the rubber-like body 28 has an axial thickness corresponding to the axial spacing between the inner ends of the cylindrical end sections 22 and 23 of the inner coupling body 19. Just beyond its half-way point radially outward, the rubber-like body 28 presents convex surfaces 31 and 32 which curve radially outward and axially toward each other. These surfaces are joined to a radially outwardly extending, reduced neck section 33 of body 28, which has a much smaller axial thickness than that of the radially inward half of body 28. The radially outward end of this neck section 33 is joined to an axially longer, cylindrical outer end section 34, which is bonded to the inside of ring 18 along the latter's entire axial length.

In accordance with the present invention, a coil spring annulus 35, preferably of spring steel, is embedded in and bonded to, the rubber-like body 28 at the axially thicker, radially inward half of the latter. This coil spring is composed of successive interconnected helical turns and the coil spring as a whole is bent into a ring with its opposite ends welded together. Preferably, the material of the coil spring is oblong in cross-section, with its maximum cross-sectional dimension extending substantially radially, as shown in FIG. 2. This provides a maximum radial thickness of the rubber-like material of body 28 trapped between neighboring turns of the coil spring to restrain these turns against being deformed radially.

In this embodiment of the present invention, each inside turn of the coil spring annulus 35 is snugly seated in a respective groove 27 on the inner coupling body 19. The helix angle of each inside turn of the coil spring annulus corresponds substantially to the helix angle of the respective groove 27 so as to provide maximum metal-to-metal contact between teeth on the inner coupling body 19 between its grooves 27 and the coil spring annulus at all of the latter's inside turns. Except at these grooves, however, the coil spring annulus is completely embedded in and bonded to, the rubber-like material of body 28.

The coil spring annulus 35, when unstressed (except the stress due to its being bent into annular shape and having its ends connected together), has an inside diameter less than the diameter of the inner coupling body 19 at the bottom of the grooves 27 in the latter. Therefore when the coil spring annulus 35 is applied to the inner coupling body, it must be stretched radially at the inside to pass axially over the end of the inner coupling body 19 and then it snaps into the grooves 27, with its inside turns being under radial stress and resiliently gripping the inner coupling body 19 at these grooves.

After the coil spring annulus 35 has been assembled onto the inner coupling body 19, they are inserted into a mold and the metal ring 18 is also positioned in this mold, surrounding and spaced radially outward from the outside turns of the coil spring annulus 35. At this time ring 18 has an outside diameter substantially greater than its final outside diameter in the completely assembled coupling. The mold itself is shaped to form the opposite axial ends of the rubber-like body 28 between ring 18 and the outside of the inner coupling body 19. The rubber or other rubber-like material is introduced into the mold and is molded in place between the inner coupling body 19 and ring 18. Preferably, the opposite end faces of the reduced neck section 33 of the molded body are flat and are radially disposed, as indicated in dotted lines at 33a and 33b in FIG. 1.

After the rubber-like material has cured, the ring 18 is acted upon by a compressing machine having a plurality of rollers which contract the ring 18 to a smaller outside diameter such that it can be slidably inserted inside the flange portion 15 on the outer coupling member. This radial contraction of ring 18 puts the rubber-like material of body 28, particularly at its outer end section 34 and its reduced neck 33, under substantial radial compression. This significantly increases the useful life of the coupling, as well as preventing any tendency of the rubber-like body 28 to become detached from ring 18 as a result of outward radial stresses which may be imposed during the operation of the coupling. The radial compression causes the previously flat end faces of the reduced neck 33 to bulge outwardly, as shown in full lines in FIG. 1.

With this arrangement, there is a direct, metal-to-metal, torque-transmitting connection between the teeth of the inner coupling body 19 between its grooves 27 and all of the inside turns of the coil spring annulus 35. The coil spring annulus provides a resilient reinforcement for the rubber-like body to enhance the torque capacity of the latter, which acts as a deformable and resilient connection between the inner coupling structure 19 and the outer coupling structure 10. Note that this coil spring annulus provides a reinforcement for the rubber-like body 28 at the radially inward half of the latter, where the torque loading is most severe. The coil spring annulus, however, does not extend into the radially outward end of the rubber-like body 28 and does not impair the desired flexibility there, which is enhanced because of its reduced axial thickness at the neck portion 33. Therefore, this particular construction of the coil spring annulus 35 and the rubber-like body 28 provides an exceptionally effective combination of high torque capacity and flexibility.

Figure 4:
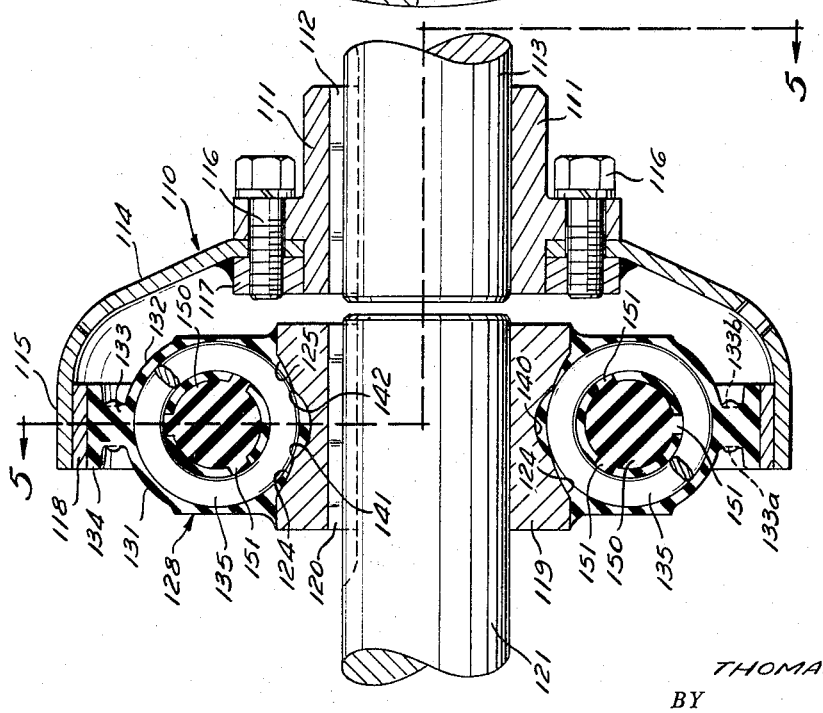
FIGURE 4 is an axial section of a second embodiment of the present coupling.

FIGURES 4 and 5 show a second embodiment of this invention which is basically similar to the first embodiment, except that the inner coupling structure does not have grooves for receiving the inside turns of the coil spring annulus. Corresponding parts of this second embodiment have the same reference numerals, plus 100, as those of the first embodiment, which has already been described in detail. The description of these parts will not be repeated.

In this second embodiment the inner coupling body 119 has a central external groove 140 disposed between its external concave surfaces 124 and 125. The coil spring annulus 135 must be stretched radially at its inside turns before it can be applied endwise over the inner coupling body 119. After being applied, its inside turns are under radial stress so that they resiliently grip annular corners 141 and 142 on the outside of the inner coupling body 119 where the central groove 140 intersects the concave surfaces 124, 125.

In this embodiment, the reinforcing coil spring annulus 135 extends through substantially more than the radially inward half of the rubber-like body 128, and the reduced neck 133 on the latter is comparatively short radially. Consequently, this coupling construction provides an increased torque capacity and somewhat reduced flexibility, as compared with the construction of FIGS. 1–3.

As shown in FIGS. 4 and 5, where the coupling is of relatively large size, a considerable manufacturing economy is obtained by providing inside the turns of the coil spring annulus 135 a central annular core 150 of reclaimed rubber, which may be made from used, cord-reinforced automobile tires. This core may be extruded in the cross-sectional shape shown in FIG. 4, and cured to the desired hardness, presenting a plurality of circumferentially spaced, radially protruding ribs 151 along its length which engage the inside turns of the coil spring annulus. When the body 128 is being molded around the coil spring annulus 135 and between the inner coupling body 119 and the metal ring 118, the rubber-like material of body 128 flows into the spaces between this central core 150 and the inside turns of the coil spring annulus. The torque load within the turns of the coil spring annulus is relatively low and hence it is not necessary for the successful operation of the coupling and not desirable from the standpoint of cost to fill this central annular space with new rubber. Consequently, the use of a central core of reclaimed rubber or other suitable material is advantageous.

Except for the differences just pointed out, the embodiment of FIGS. 4 and 5 is essentially similar in construction, mode of assembly, and mode of operation to the embodiment of FIGS. 1–3 already described in detail. The rubber-like body 128 is under compression by the metal ring 118 as described with reference to FIGS. 1–3 and for the same purpose.

From the foregoing description it will be apparent that each of the illustrated embodiments of this coupling is well adapted for the accomplishment of the stated objectives of the present invention. However, while two presently-preferred embodiments of this coupling have been described with reference to the accompanying drawings, it is to be understood that various modifications which depart from the disclosed embodiments may be adopted without departing from the spirit and scope of the present invention.

I claim:
1. A flexible coupling comprising:
a rotatable outer coupling structure;
a rotatable inner coupling structure mounted for rotation generally coaxial with said first coupling structure and disposed radially inward with respect to the latter;
a deformable and resilient annular body of rubber-like material engaged between said outer coupling structure and the outside of said inner coupling structure;
and a continuous coil spring annulus composed of successive interconnected helical turns embedded in said body of rubber-like material, with its successive helical turns disposed in succession along the annular extent of said body of rubber-like material.

2. A flexible coupling comprising:
a rotatable outer coupling structure;
a rotatable inner coupling structure mounted for rotation generally coaxial with said first coupling structure and disposed radially inward with respect to the latter;
a deformable and resilient annular body of rubber-like material bonded to both said outer coupling structure and said inner coupling structure and engaged between them under substantial radial compression;
and a continuous coil spring annulus composed of successive interconnected helical turns embedded in said body of rubber-like material, with its successive helical turns disposed in succession along the annular extent of said body of rubber-like material and with its inside turns expanded radially and resiliently gripping the outside of said inner coupling structure.

3. A flexible coupling comprising:

a rotatable first coupling structure having an annular outer flange;

a rotatable second coupling structure mounted for rotation generally coaxial with said first coupling structure and disposed radially inward from said outer flange;

a deformable and resilient annular body of rubber-like material bonded to both said outer flange and the outside of said second coupling structure, said body having an inner portion of substantial axial thickness which extends radially outward from said second coupling structure for an appreciable fraction of the total radial extent of said body, said body having a portion of substantially reduced axial thickness radially outward from said inner portion;

and a coil spring annulus composed of successive interconnected helical turns embedded in said inner portion of said body to resiliently reinforce the latter without impairing the flexibility provided by said body portion of reduced axial thickness.

4. A flexible coupling according to claim 3, wherein said coil spring is substantially thicker in radial cross-section than in axial cross-section.

5. A flexible coupling comprising:

a rotatable first coupling structure having an annular outer flange;

a rotatable second coupling structure mounted for rotation generally coaxial with said first coupling structure and disposed radially inward from said outer flange;

a deformable and resilient annular body of rubber-like material bonded to both said outer flange and the outside of said second coupling structure and under substantial radial compression between them, said body having an inner portion of substantial axial thickness which extends radially outward from said second coupling structure for an appreciable fraction of the total radial extent of said body, said body having a portion of substantially reduced axial thickness radially outward from said inner portion;

and a coil spring annulus composed of successive interconnected helical turns embedded in said inner portion of said body to resiliently reinforce the latter without impairing the flexibility provided by said body portion of reduced axial thickness.

6. A flexible coupling according to claim 5, wherein said coil spring annulus resiliently grips the outside of said second coupling structure.

7. A flexible coupling according to claim 6, wherein said second coupling structure has a plurality of external grooves spaced apart in succession around its circumference, and said coil spring annulus has its inside turns seated tightly in said grooves.

8. A flexible coupling according to claim 6, and further comprising a central core disposed inside the successive convolutions of said coil spring annulus.

9. A flexible coupling comprising:

a rotatable first coupling structure having an annular flange portion, and a separately formed ring secured to the inside of said flange portion;

a rotatable second coupling structure mounted for rotation generally coaxial with said first coupling structure and disposed radially inward from said ring;

a deformable and resilient annular body of rubber-like material bonded to both the inside of said ring and the outside of said second coupling structure and held under substantial radial compression by said ring, said body having an inner portion of substantial axial thickness which extends radially outward from said second coupling structure for an appreciable fraction of the total radial extent of said body, said body having a portion of substantially reduced axial thickness radially outward from said inner portion;

and a coil spring annulus composed of successive interconnected helical turns embedded in said inner portion of said body to resiliently reinforce the latter without impairing the flexibility provided by said body portion of reduced axial thickness.

10. A flexible coupling according to claim 9, wherein said coil spring annulus resiliently grips the outside of said second coupling structure.

11. A flexible coupling according to claim 10, wherein said second coupling structure has a plurality of external grooves spaced apart in succession around its circumference, and said coil spring annulus has its inside turns seated tightly in said grooves.

12. A flexible coupling according to claim 11, wherein said grooves extend at substantially the same helix angle as the inside turns of said coil spring annulus.

13. A flexible coupling according to claim 10, and further comprising a central core disposed inside the successive convolutions of said coil spring annulus.

14. A flexible coupling according to claim 13, wherein said core has spaced, outwardly projecting ribs which engage the inside turns of said coil spring annulus.

15. A flexible coupling according to claim 9 wherein said coil spring is substantially thicker in radial cross-section than in axial section.

References Cited

UNITED STATES PATENTS

| | | | |
|---|---|---|---|
| 2,096,039 | 10/1937 | Higgins | 64—15 |
| 2,154,077 | 4/1939 | Sampson | 64—11 |
| 2,995,907 | 8/1961 | Orain | 64—11 |
| 3,080,734 | 3/1963 | Crankshaw | 64—11 |

FOREIGN PATENTS

| | | |
|---|---|---|
| 316,166 | 7/1929 | Great Britain. |
| 483,053 | 7/1953 | Italy. |

HALL C. COE, *Primary Examiner.*